United States Patent
Gorowicz et al.

(10) Patent No.: US 7,261,933 B2
(45) Date of Patent: Aug. 28, 2007

(54) HEADLINER HAVING INTEGRATED ENERGY ABSORBING FOAM

(76) Inventors: Janusz P. Gorowicz, 11177 Homeshore Dr., Pinckney, MI (US) 48169; Alan D. Picken, 2150 Hickory Ridge Trail, Milford, MI (US) 48380; Roland Heiberger, 18063 Wildflower Dr., Northville, MI (US) 48163; Normand R. Marceau, 4487 Loon Harbor La., Linden, MI (US) 48451

( * ) Notice: Subject to any disclaimer, the term of this patent is extended or adjusted under 35 U.S.C. 154(b) by 350 days.

(21) Appl. No.: 10/262,735

(22) Filed: Oct. 2, 2002

(65) Prior Publication Data

US 2003/0044580 A1    Mar. 6, 2003

Related U.S. Application Data

(62) Division of application No. 09/688,726, filed on Oct. 16, 2000, now Pat. No. 6,500,369.

(60) Provisional application No. 60/159,418, filed on Oct. 14, 1999.

(51) Int. Cl.
    *B32B 5/18* (2006.01)
(52) U.S. Cl. .............. 428/159; 296/214; 428/141; 428/158; 428/160; 428/317.9
(58) Field of Classification Search .......... 296/214; 428/245, 246, 247, 317.1, 317.9, 141, 158, 428/159, 160
    See application file for complete search history.

(56) References Cited

U.S. PATENT DOCUMENTS 4,381,908 A    5/1983    Roth (Continued)

FOREIGN PATENT DOCUMENTS

DE    32 06 468 A1    9/1983

(Continued)

OTHER PUBLICATIONS

PCT International Search Report (2001).

*Primary Examiner*—Allan R. Kuhns
(74) *Attorney, Agent, or Firm*—Honigman Miller Schwartz and Cohn LLP

(57) ABSTRACT

A method of manufacturing a headliner assembly for use in the interior compartment of an automotive vehicle comprising the steps of: placing a mold release film onto a concave mold surface of a lower mold assembly for providing a barrier against the mold surface; placing a fiber mat on the mold release film; applying a foamable material directly onto the fiber mat; expanding the foamable material around the fiber mat to embed the fiber mat therein; placing an adhesive film onto a convex mold surface of an upper mold assembly; positioning the lower mold assembly directly beneath the upper mold assembly; moving the upper mold assembly in mating engagement with the lower mold assembly to define a mold cavity between the convex mold surface and concave mold surface; curing the foamable material within the mold cavity; and bonding the mold release film and adhesive film to the foamable material with the fiber mat embedded therebetween. A layer of scrim is then adhered to the mold release film and a layer of fabric is adhered to the adhesive film for providing a decorative cover to the headliner assembly.

10 Claims, 5 Drawing Sheets

U.S. PATENT DOCUMENTS

| | | | |
|---|---|---|---|
| 4,385,955 A | 5/1983 | Doerfling et al. | 156/245 |
| 4,591,469 A | 5/1986 | Buchanan et al. | |
| 4,675,231 A * | 6/1987 | Kia | 442/103 |
| 4,741,945 A | 5/1988 | Brant et al. | |
| 4,766,031 A | 8/1988 | Kohl | |
| 4,839,397 A | 6/1989 | Lohmar et al. | |
| 5,007,976 A * | 4/1991 | Satterfield et al. | 156/222 |
| 5,022,943 A * | 6/1991 | Zaima | 156/222 |
| 5,112,542 A | 5/1992 | Beer | |
| 5,312,848 A * | 5/1994 | Klapper et al. | 521/172 |
| 5,509,247 A | 4/1996 | Fortez et al. | |
| 5,527,833 A * | 6/1996 | Kuczynski et al. | 521/155 |
| 5,591,289 A | 1/1997 | Souders et al. | 156/148 |
| 5,660,901 A * | 8/1997 | Wong | 428/35.7 |
| 5,683,796 A | 11/1997 | Kornylo et al. | |
| 5,700,050 A | 12/1997 | Gonas | |
| 5,721,038 A | 2/1998 | Kornylo et al. | |
| 5,723,534 A * | 3/1998 | Murray | 524/590 |
| 5,823,611 A * | 10/1998 | Daniel et al. | 296/214 |
| 5,833,304 A | 11/1998 | Daniel et al. | |
| 5,845,458 A * | 12/1998 | Patel | 52/782.1 |
| 5,975,623 A | 11/1999 | Shikimachi et al. | |
| 6,036,227 A * | 3/2000 | Lin et al. | 280/751 |
| 6,054,022 A * | 4/2000 | Helwig et al. | 162/156 |
| 6,156,682 A * | 12/2000 | Fletemier et al. | 442/394 |
| 6,500,369 B1 * | 12/2002 | Gorowicz et al. | 264/46.5 |

FOREIGN PATENT DOCUMENTS

| | | |
|---|---|---|
| DE | 198 08 026 A1 | 9/1999 |
| EP | 0 286 058 A2 | 10/1988 |
| WO | WO 00/44561 | 8/2000 |

* cited by examiner

HEADLINER HAVING INTEGRATED ENERGY ABSORBING FOAM

RELATED APPLICATION

This application is a divisional application of Ser. No. 09/688,726, filed Oct. 16, 2000, now U.S. Pat. No. 6,500,369, which claims the benefit of Provisional Application No. 60/159,418, filed Oct. 14, 1999.

BACKGROUND OF THE INVENTION

1. Field of the Invention

The subject invention generally relates to a headliner assembly and a method and apparatus for manufacturing a headliner assembly of an automotive vehicle. More specifically, the invention relates to a method and apparatus for manufacturing a headliner assembly having integrated energy absorbing foam.

2. Description of the Related Art

Automotive vehicle headliner assemblies are used to line the ceiling or underside of the roof within the interior compartment of the vehicle. The headliner assembly typically includes a fabric layer that provides a decorative cover to the ceiling, a soft flexible foam intermediate layer of a relatively thin configuration, a layer of imperforate urethane film laminate disposed on the surface of the soft foam intermediate layer opposite the fabric layer, and a thick, rigid polyurethane foam layer formed on the imperforate film as the innermost layer of the headliner assembly.

It is also known to manufacture headliner assemblies having varying thicknesses of urethane foam for providing enhance strength characteristics and acoustical effects. For example, U.S. Pat. No. 5,683,796 discloses a method of making a headliner assembly having an exterior surface of a fabric layer providing a decorative cover and a body of foamed material adhered to the opposite interior surface of the fabric layer having central portions with a greater thickness than peripheral portions thereof. The body of foamed material has a constant density throughout its extent including the central and peripheral portion to provide desired strength, weight and acoustic characteristics to the overall headliner assembly. However, the headliner assembly of this type does not adequately address desired energy absorption characteristics or rigidity for use in mating engagement with the roof of the vehicle.

Therefore, it is desirable to manufacture a headliner assembly having contoured portions of varying foam thickness and density by embedding a fiber mat within a layer of urethane foam forming a rigid and integrated energy absorbing headliner assembly.

SUMMARY OF THE INVENTION

The present invention relates to a method of manufacturing a headliner assembly for use in the interior compartment of an automotive vehicle comprising the steps of: placing a mold release film onto a concave mold surface of a lower mold assembly for providing a barrier against the mold surface; placing a fiber mat on the mold release film; applying a foamable material directly onto the fiber mat; expanding the foamable material around the fiber mat to embed the fiber mat therein; placing an adhesive film onto a convex mold surface of an upper mold assembly; positioning the lower mold assembly directly beneath the upper mold assembly; moving the upper mold assembly in mating engagement with the lower mold assembly to define a mold cavity between the convex mold surface and concave mold surface; curing the foamable material within the mold cavity; and bonding the mold release film and adhesive film to the foamable material with the fiber mat embedded therebetween. The layer of scrim is then adhered to the mold release film and a layer of fabric is adhered to the adhesive film for providing a decorative cover to the headliner assembly.

The present invention also relates to a molding apparatus for manufacturing a headliner assembly for use in the interior compartment of an automotive vehicle comprising a support frame. An upper mold assembly is supported by the support frame for vertical movement and includes a convex mold surface. A lower mold assembly is supported by the support frame beneath the upper mold assembly and includes a concave mold surface. The upper mold assembly is movable into mating engagement with the lower mold assembly to define a mold cavity formed between the convex mold surface and the concave mold surface for manufacturing the headliner assembly therein.

The headliner assembly comprises a fiberglass mat embedded within a layer of urethane foam forming a contoured substrate having opposing first and second sides. A mold release film is affixed to the first side and an adhesive film is affixed to the second opposing side. A layer of scrim is adhered to the mold release film for providing resiliency and sound absorption to the headliner assembly. A layer of fabric is adhered to the adhesive film for providing a decorative cover to the headliner assembly wherein the headliner assembly is formed of a predetermined contour having areas of various thickness of the urethane foam for providing integrated energy absorption in the headliner assembly.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
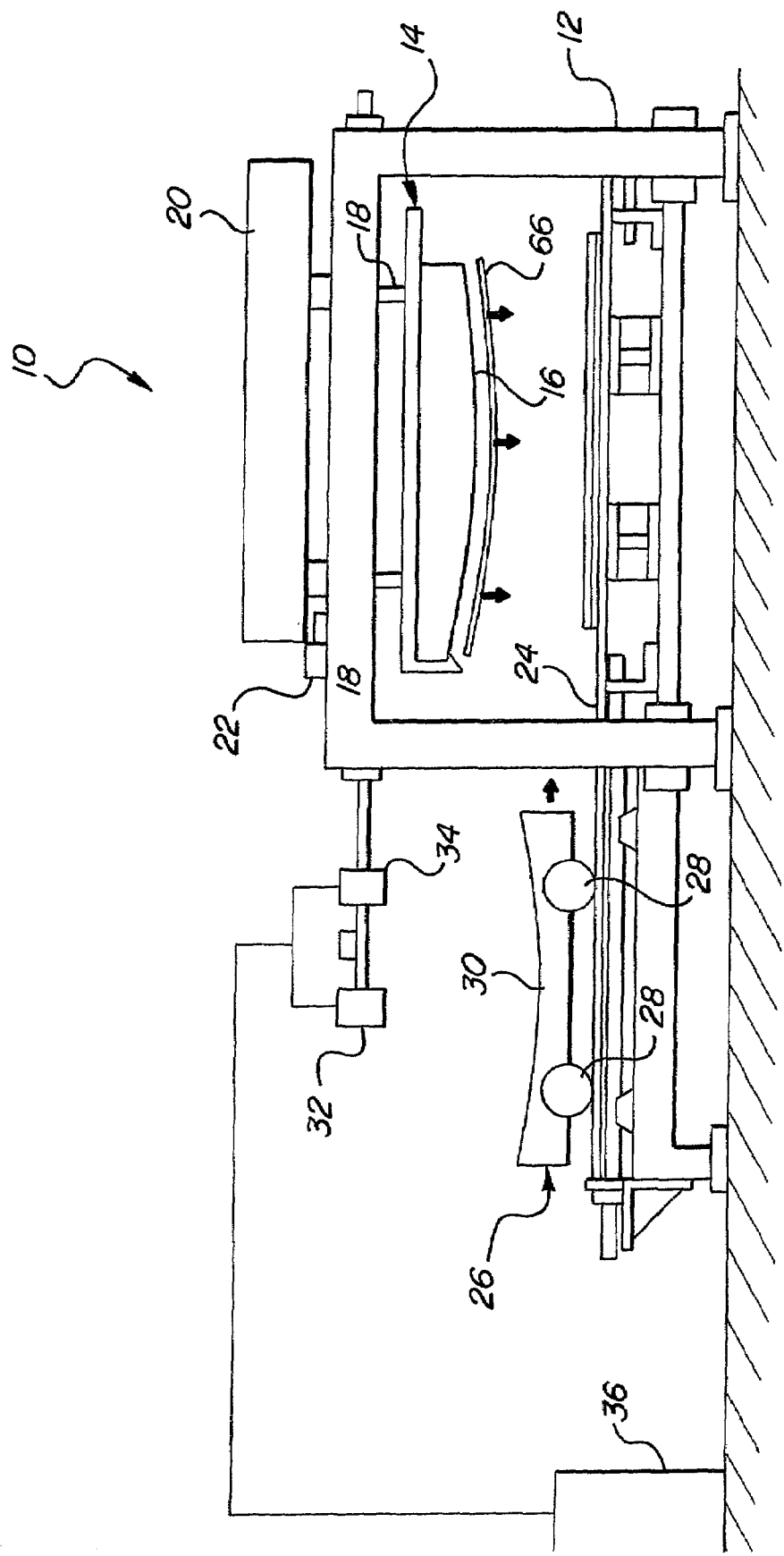
FIG. 1 is a schematic side view showing a molding apparatus utilized in manufacturing the headliner assembly in accordance with the principles of the present invention.

Referring to the Figures, wherein like numerals indicate like or corresponding parts throughout the several views, a schematic side view of a molding apparatus 10 used for manufacturing a headliner assembly in accordance with the principles of the present invention is generally shown in FIG. 1. The molding apparatus 10 includes a rigid support frame 12 for supporting an upper mold assembly 14 for vertical movement. The upper mold assembly 14 has a convex mold surface 16 which is shaped in conformance with the desired uppermost configuration for the headliner assembly. The vertical movement of the upper mold assembly 14 can be accomplished by any conventional means. In the preferred embodiment of FIG. 1, the apparatus 10 includes a pair of die press columns 18 coupled to the frame 12 and extending between the upper mold assembly 14 and a die press 20. The die press 20 actuates the die press columns 18 and the upper mold assembly 14 for movement vertically with respect to the frame 12. An encoder 22 determines and controls the relative position of the upper mold assembly 14.

Figure 3:
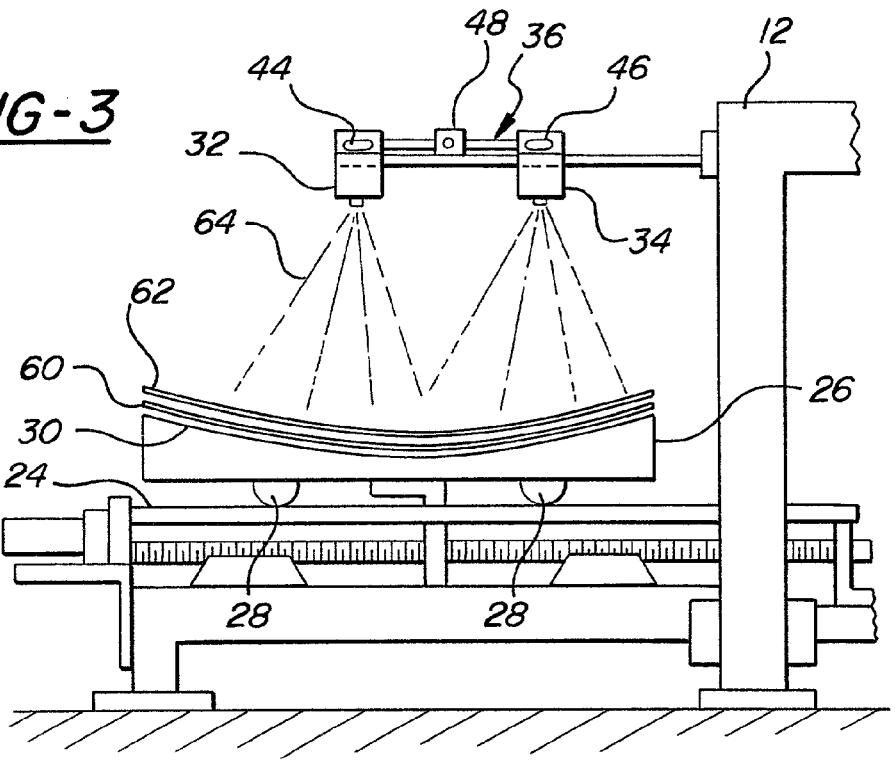
FIG. 3 is an top view of the portion of the molding apparatus shown in FIG. 2.

The molding apparatus 10 further includes a fixed lower track assembly 24 which extends through the frame 12 beneath the upper mold assembly 14. A lower mold assembly 26 is mounted for horizontal movement on the track assembly 24 by bearings or wheel members 28. In FIG. 1, the lower mold assembly 26 is shown in its initial start position. The lower mold assembly 26 is movable along the track assembly 24 between the start position and a mold position under the upper mold assembly 14 for cooperation therewith, as shown in FIG. 3. The lower mold assembly 26 includes a concave mold surface 30 which is shaped in conformance with the desired lowermost configuration for the headliner assembly. A pair of spray heads 32, 34 are mounted on the frame 12, above the lower mold assembly 26 in the start position, for transverse movement with respect to the lower mold assembly 26. The spray heads 32, 34 are connected to a source of foamable material, such as liquid urethane, as designated at 36. A pair of spray heads 32, 34 are provided in order to reduce the amount of time to apply the liquid foamable material during the manufacturing process.

Figure 2:
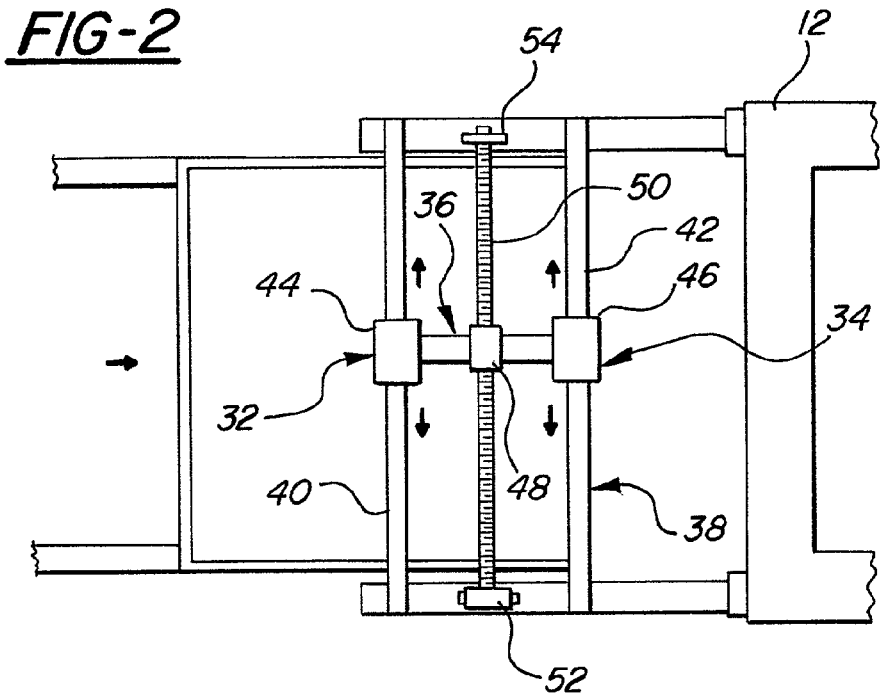
FIG. 2 is a partial schematic side view showing the start position of the molding method and apparatus.

Referring to FIG. 2, the spray heads 32, 34 are spaced apart and fixedly mounted on a carriage assembly 36 which is mounted for movement on an upper track assembly 38 fixed to the frame 12 and suspended above the lower mold assembly 26. That is, the track assembly 38 suspends the spray heads 32, 34 and carriage assembly 36 above the lower mold assembly 26 in the start position for application of the liquid foamable material. The upper track assembly 38 includes a pair of parallel track members 40, 42 extending transverse, or substantially perpendicular, to the lower track assembly 24 therebeneath. A pair of spray head mounting members 44, 46 are each slidably mounted on a respective track member 40, 42, such as by a bearing coupling. The carriage assembly 36 includes a connecting drive nut 48 having internal threads which cooperate with external threads of a drive screw 50. The drive screw 50 is mounted for rotation on the upper track assembly 38 and extends in parallel relation between the track members 40, 42. The drive screw 50 is rotated at one end by a bi-directional electric motor 52 to effect transverse movement of the carriage assembly 36, and spray heads 32, 34, on the track assembly 38. The opposite end of the drive screw 50 is rotatable mounted in a bearing coupling 54 on the track assembly 38. The bi-directional motor 52 is adapted to alternately rotate the drive screw 50 in opposite directions to effectuate fore and aft movement of the carriage assembly 36 along the upper track assembly 38. The direction and speed of the motor 52 may be controlled by a controller, or computer.

Referring to FIG. 3, the first step on the method of manufacturing a headliner assembly in accordance with the present invention includes placing a mold release film 60 onto the concave mold surface 30 of the lower mold assembly 26 in the start position. The film 60 may be held on the concave mold surface 30 by clamps, fasteners, or vacuum pressure. The film 60 provides a barrier to the mold surface 30 from the liquid urethane 64. A fiberglass mat 62 is then laid onto the mold release film 60. The fiberglass mat 62 may by any type of fibrous mat including natural fiber. The positioning of the mold release film 60 and fiberglass mat 62 is typically done manually, however, the method may include automated placement of the layer of the film 60 and mat 62 onto the mold surface 30. The next step includes the spray heads 32, 34 applying a spray of liquid foamable material 64, preferably liquid polyurethane, to form a polyurethane foam layer around the mat 62 over the entire area of the concave mold surface 30. After the liquid urethane is sprayed onto the mat 62 it begins to crosslink and expand around the mat 62 so that the mat 62 is enclosed within the urethane. A higher volume of urethane is sprayed on area of the mat 62 for forming a greater thickness to portions of the headliner as will be further discussed hereinbelow. Either before, during or after the urethane is sprayed onto the mat 62, an adhesive film 66 is attached over the convex mold surface 16 of the upper mold assembly 14, as shown in FIG. 1. The adhesive film 66 may be secured to the upper mold assembly 14 over the convex mold surface 16 by clamps, fasteners or vacuum pressure.

Figure 4:
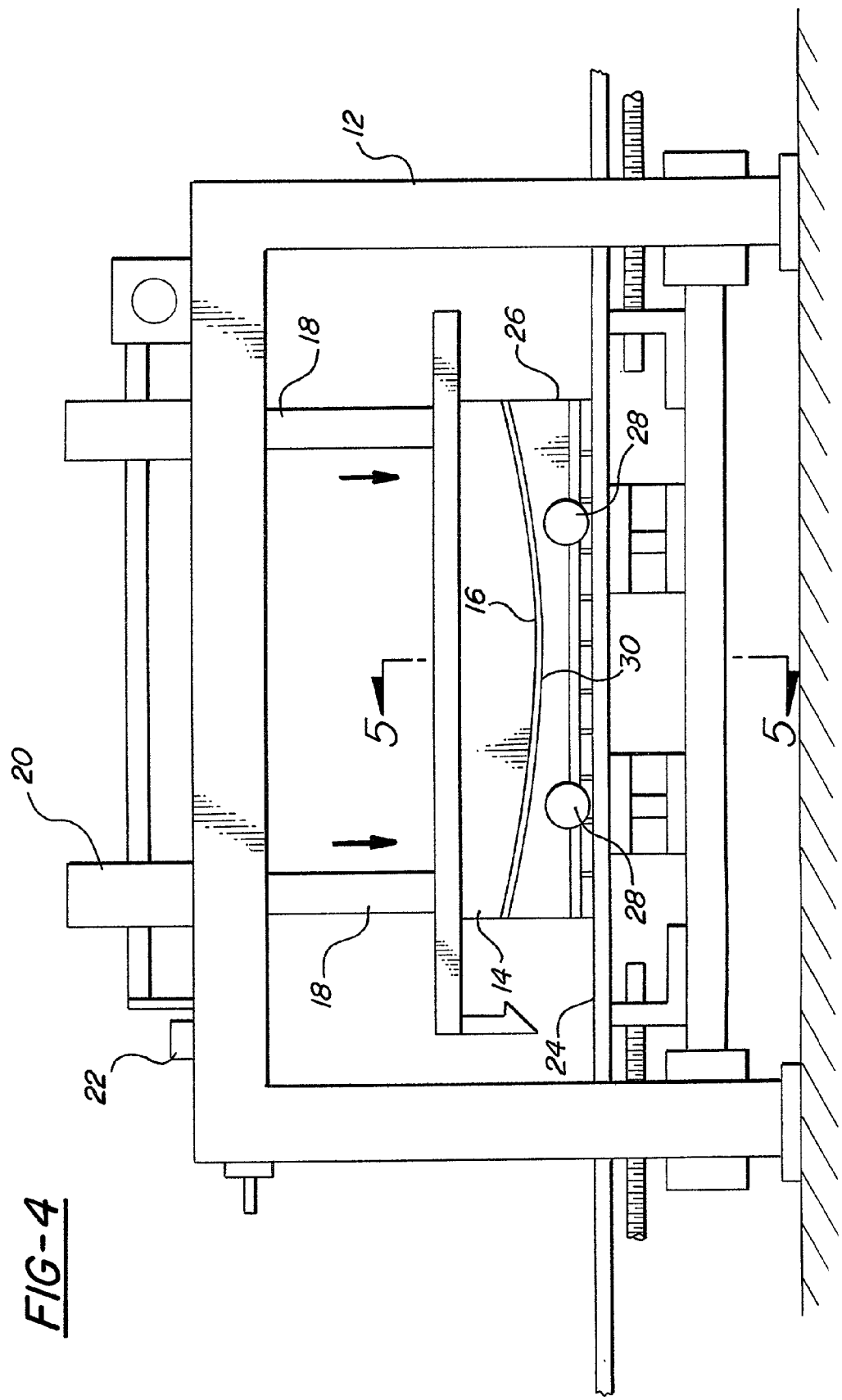
FIG. 4 is schematic side view showing the molding apparatus with the upper and lower mold assemblies in mating engagement for molding a headliner assembly.

Shortly after the liquid urethane is sprayed onto the mat 62, or even during the spraying, the lower mold assembly 26 is rolled along the lower track assembly 24 beneath the upper mold assembly 14. The die press 20 is then actuated to move the die press columns 18 downwardly and lower the upper mold assembly 14 into mating engagement with the lower mold assembly 26 as shown in FIG. 4. A cavity is formed by the mating engagement of the upper 14 and lower 26 mold assemblies between the convex mold surface 16 and the concave mold surface 30. The molds 14, 26 remain in mating engagement while the urethane continues to expand and fills the cavity between the mold surfaces 16, 30. The cavity, defined by the convex and concave shape of the respective mold surfaces 16, 30, forms the shape of the headliner with dimensions as specified by a particular vehicle design. Additionally, heat and/or pressure may be applied to the upper 14 and/or lower 26 mold assemblies to increase the rate of expansion and formation of the urethane as desired.

Figure 5:
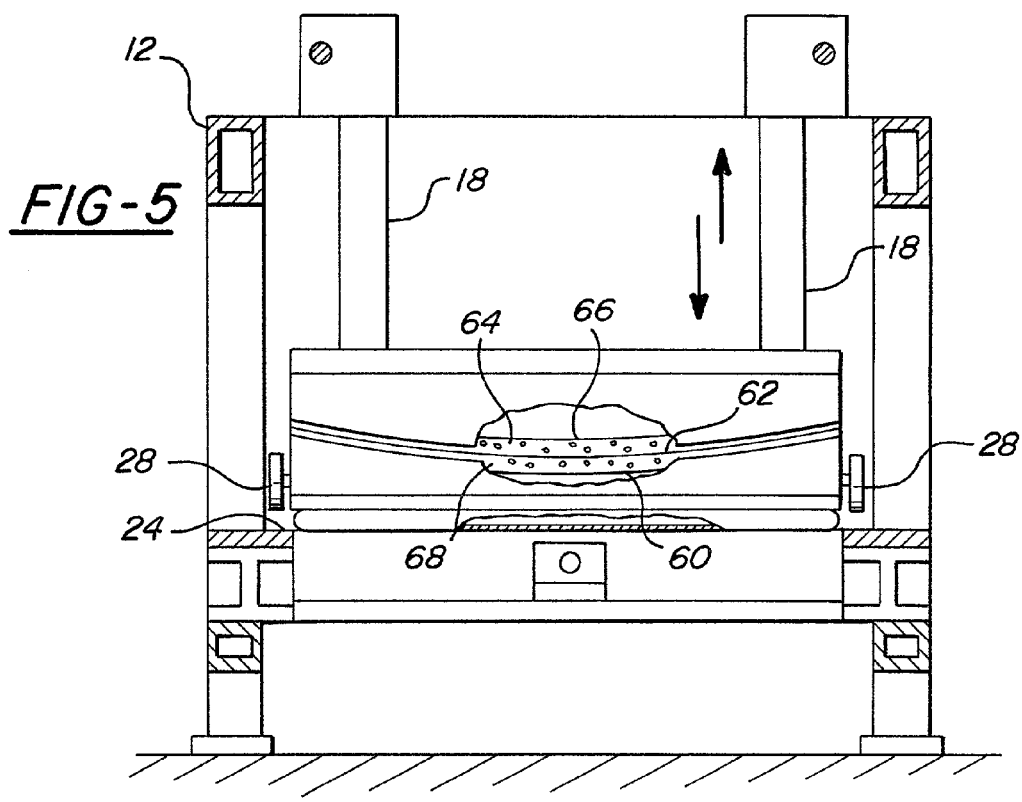
FIG. 5 is a sectional view taken along line 5-5 of FIG. 4.
Figure 6:
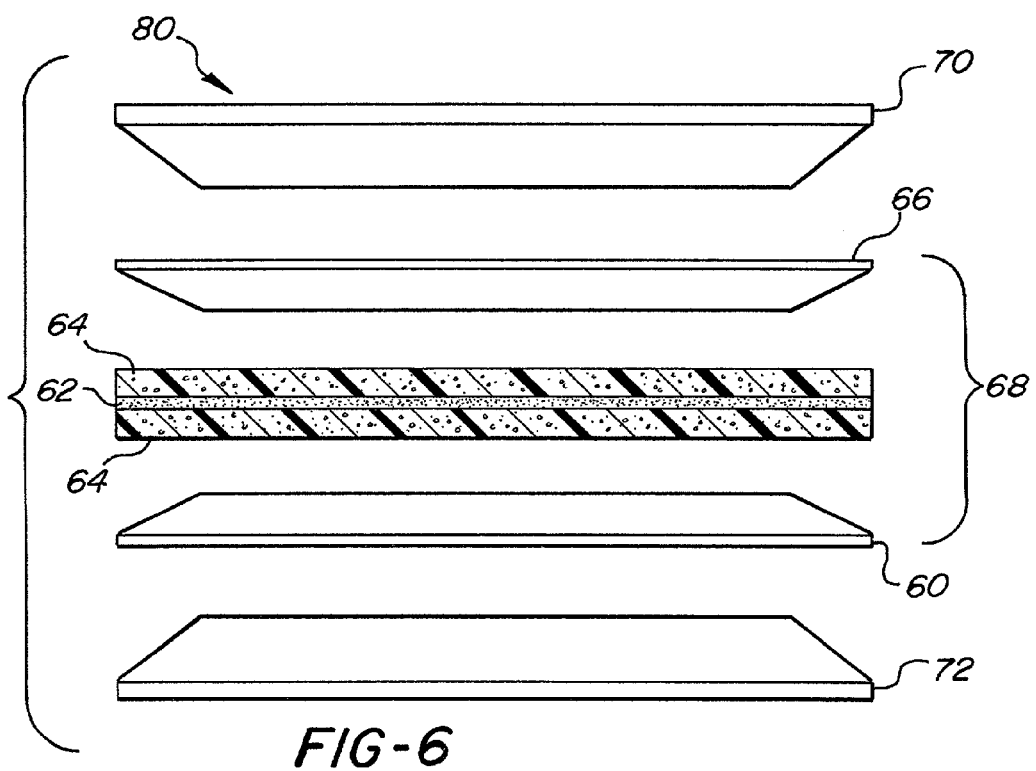
FIG. 6 is a partially exploded view of the headliner assembly showing the different layers of the headliner assembly in accordance with the principles of the present invention.

The urethane eventually cures and bonds to the mold release film 60 and adhesive film 66 forming a urethane substrate 68 with the fiberglass mat 62 embedded within the urethane 64, as shown in FIG. 5. Referring to FIG. 6, subsequent to the forming of the urethane substrate 68, a layer of fabric 70 is applied to, or laid over, the adhesive film 66. Heat is applied to activate the adhesive film 66 for bonding the fabric 70 to the substrate 68. The fabric 70 comprises a layer of woven or non-woven material, such as cloth, vinyl, or leather, which may be foam backed for providing a decorative cover to the interior passenger compartment of the vehicle.

A layer of scrim 72 is also applied to, or laid over, the mold release film 60 and bonded thereto with web adhesive or an equivalent as is known to one skilled in the art. The scrim 72 comprises a layer of cotton fiber, synthetic fiber, or foam as is known to one skilled in the art, for preventing squeaking noise with the roof of the vehicle when attached thereto. Alternatively, the mold release film 60 may be a laminate of film 60 and scrim 72. Still further, the mold release film 60 and/or adhesive film 66 may be a prelaminated combo mat including the film 60, 66, scrim 72 and chopped glass.

Referring to FIG. 6, a partially exploded view of a headliner is shown at 80 as constructed according to the above described method. The fiberglass mat 62 is shown surrounded by, embedded and suspended within the urethane foam 64 forming the urethane substrate 68 to enhance the strength characteristics of the headliner 80. The mold release film 60 is attached to one side of the substrate 68 and the adhesive film 66 is attached to the other side of the substrate 68. The fabric 70 is adhered to the adhesive film 66 and the scrim 72 is adhered to the mold release film 60.

The thickness of the substrate 68 is inversely proportional to the density of the urethane. Although the amount of liquid urethane 64 applied to the mat 62 can be adjusted according to desired design thickness of the headliner 80, the narrower cross-section of the substrate 68 will still have higher density than the thicker cross-sections due to the expansion properties of the urethane 64.

The exterior dimensions of the headliner 80 and overhead component holes may be cut with a water jet (not shown), however, other conventional methods of cutting such as with a piercing tool will suffice. When edge wrapping of the headliner 80 with the fabric 70 is desired, a pre-cut of the exterior dimensions are made to the substrate 68 prior to applying the fabric 70. A second cut is made of the fabric 70 leaving enough excess fabric to edge wrap as is known in the art of headliner manufacturing.

Figure 7:
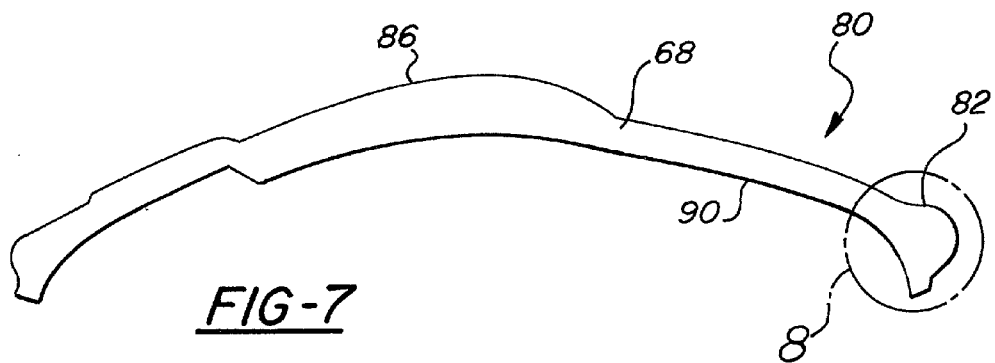
FIG. 7 is a side view showing the contour of the headliner assembly.

The cross-section of an example contour for the headliner 80 is shown in FIG. 7.

An alternative method of manufacturing does not require that the lower mold 26 be mobile which allows for the elimination of the lower mold wheels 28. Therefore, the lower mold 26 is stationary beneath the upper mold 14. For the alternative method, the liquid urethane 64 is applied to the mold release film 60 and mat 62 which rests on a flat surface and a wet composite is subsequently slid onto the lower mold 26 while beneath the upper mold 14. The upper mold 14 is actuated into mating engagement with the lower mold 26 by the die press 20 for forming the substrate 68 and the process is continued according to the prior method stated hereinabove.

Figure 8:
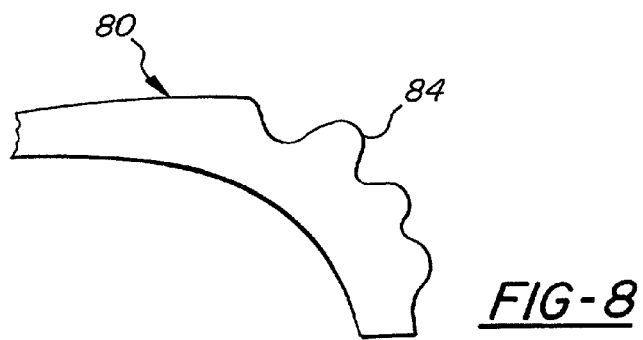
FIG. 8 is an enlarged view of the energy absorbing contour in the area A of FIG. 7.

The method for manufacturing the headliner 80 provides design benefits for the headliner not available to prior art manufacturing methods. For example, devices, such as foam blocks, sinusoidal plastic inserts, rib cartridges and wire cages are glued to upper surfaces of headliners for absorbing head impact energy. The addition of these devices adds assembly time and significant cost to the price of a headliner assembly. The subject manufacturing method provides the ability to add head impact contours as shown at 82 into the urethane substrate 68 as is represented in FIG. 7. The addition of these contours 82 does not add cost and assembly time to the headliner manufacturing process. The contour and thickness of the urethane substrate 68 can be modified to optimize energy absorption by simply designing the tool cavity accordingly. For example, it is known to those of skill in the art of energy absorption that sinusoidal contours in energy absorbing components provide more energy absorption than does a smooth contour. Sinusoidal contours can be designed into the mold cavity providing the desired energy absorption properties to the headliner assembly without adding additional components to the assembly. A sinusoidal contour 84 is represented best in FIG. 8. Alternate contours such as, for example, a pattern of cavities in the substrate 68 is also known to be effective both for molding and for energy absorption. Alternatively, energy absorbing devices can be inserted into the mold cavity prior to the liquid urethane wherein the urethane will expand around the device securing it onto the substrate 68. This eliminates the step of gluing the device to the substrate 68.

The thickness of the urethane substrate 68 is known to be directly proportional to the overall strength of the headliner 80. An increase in thickness of the headliner 80 provides efficiency benefits to vehicle manufacturing derived from the strength of the headliner 80. For example, modern vehicle manufacturing utilizes modular subassemblies such as a headliner assembly having all of the overhead components (i.e. sun visors, assist grips, coat hooks) attached prior to being installed into a vehicle. Current headliner substrate technology, such as tramivex, dry polyurethane and fiberglass is not able to support these overhead components during a modular build operation without cracking and breaking. The urethane substrate 68 of the subject concept can be thickened either locally, or generally, providing the strength as needed for supporting the modular build components.

The thickness of the urethane substrate 68 can also be optimized for providing structural support to a vehicle roof. For example, gluing the upper surface 86 of the headliner 80 to an underside of a vehicle roof with hot melt glue or an equivalent provides enough structural support to the roof to eliminate structural roof bows. The elimination of the structural roof bows increases vehicle interior space, reduces vehicle mass, and reduces vehicle cost. Utilizing the subject headliner 80 for structural support prevents deflection of the vehicle roof while under a load of up to several hundred pounds.

Figure 9:
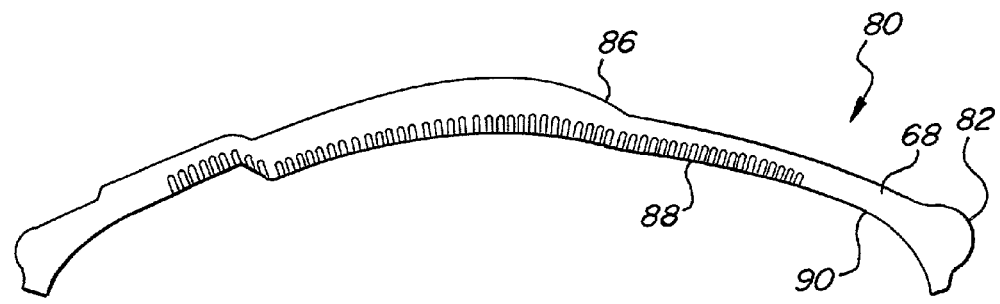
FIG. 9 is a side view of the headliner assembly showing sound absorbing apertures disposed therein.

To meet vehicle interior acoustic standards, the urethane substrate 14 may include a plurality of apertures 88 pierced into the lower surface 90 as shown in FIG. 9. The apertures 88 deflect sound waves reverberating inside the vehicle interior for reducing the overall sound level therein. The fabric 70 overlays the apertures 88 for preventing the apertures 88 from being visible to the vehicle occupants. A piercing step prior to affixing the fabric 70 to the urethane substrate 68 is added to the headliner manufacturing process for inserting the apertures 88. However, other methods for adding the apertures 88 are contemplated such as, for example adding pins to the surface of one or both of the upper and lower mold 14, 26.

The method for manufacturing the headliner 80 explained hereinabove further provides the ability of inserting the overhead components such as assist grips, wiring harnesses, lighting components, and coat hooks into the mold cavity thereby integrating the components into the urethane substrate 68. This further reduces the complexity of the assembly process and enhances the fit of the components to the headliner 80 by form fitting the substrate 68 to the components when the urethane expands around the components.

The invention has been described in an illustrative manner, and it is to be understood that the terminology which has been used is intended to be in the nature of words of description rather than of limitation. Many modifications and variations of the present invention are possible in light of the above teachings. It is, therefore, to be understood that the invention may be practiced otherwise than as specifically described.

What is claimed is:

1. A headliner for an interior compartment of a vehicle, the vehicle having a roof defined by a length and a width, said headliner comprising:

a foam core having a length and width dimensioned to substantially cover the length and width of the roof of the vehicle, wherein a portion of said foam core defines a head impact contour formed on a first surface of the foam core, said head impact contour including a series of undulations, wherein said series of undulations manage a load associated with head impact whereby the load is distributed among a plurality of the undulations under a head impact condition, wherein said series of undulations comprise a series of peaks separated by valleys, wherein said series of peaks are adapted to manage the load associated with head impact under a head impact condition, and wherein each of said valleys include a depth, said foam core comprises a material, and said series of undulations are provided on said first surface of said foam core and define a first surface profile, and wherein a sidewall connects each of said peaks and valleys such that two sidewalls envelope each peak, and further wherein said material extends uninterrupted below the envelope of each of said peaks and extends to a depth greater than said depth of any adjacent valley.

2. A headliner according to claim 1, wherein a transition between at least one peak and an adjacent valley is non-linear.

3. A headliner according to claim 1, wherein one of at least one peak defined by said series of peaks and at least one valley define a curved surface.

4. A headliner according to claim 1, further comprising a fiberglass mat embedded within said foam layer.

5. A headliner for a vehicle having a roof, the roof having a length and a width, said headliner comprising:
a core comprised of a foam material having a length and width dimensioned substantially coextensive with the length and width of the roof said foam core defining at least one body impact energy absorbing area adapted to manage energy attributed to impact of a body thereon, said at least one body impact energy absorbing area including a plurality of zones of increased foam material, each of said zones defining a crest of a peak, wherein each of said peaks are separated by a zone of decreased material that defines a basin of a valley, and wherein said material has a thickness at the basin that is less than a material thickness at the crest, and further wherein multiple peaks dissipate energy associated with impact of a head thereon during a head impact condition, wherein said peaks and valleys define a series of undulations on a first surface of said foam core such that a plurality of undulations dissipate energy associated with the impact of the head during the head impact condition, wherein said valleys include a depth and wherein said foam material is uninterrupted under each of said peaks to a depth greater than said depth of said valleys immediately adjacent said peak.

6. A headliner according to claim 5, wherein said series of peaks and valleys form a sinusoidal profile.

7. A headliner according to claim 5, wherein a transition between at least one peak and an adjacent valley is non-linear.

8. A headliner according to claim 5, wherein one of at least one peak and at least one valley define a curved surface.

9. A headliner for an interior compartment of a vehicle comprising:
a foam core having a portion that defines a head impact contour formed on a first surface of the foam core, said head impact contour including a series of undulations, wherein said series of undulations manage a load associated with head impact whereby the load is distributed among a plurality of the undulations under a head impact condition, wherein said first surface along said head impact contour has a first profile and a second surface opposing said first surface has a second profile, and wherein said undulations are provided on said first surface to define said first profile, and further wherein said second profile is asymmetric from said first profile.

10. A headliner for an interior compartment of a vehicle comprising:
a foam core defining a head impact contour formed on a first surface of the foam core, said head impact contour including a series of undulations, wherein said series of undulations manage a load associated with head impact whereby the load is distributed among a plurality of the undulations under a head impact condition, wherein said series of undulations comprise a series of peaks separated by valleys, wherein said series of peaks are adapted to manage the load associated with head impact under a head impact condition, wherein each of said valleys have a depth, and wherein all portions of a second surface of said foam core opposite said first surface and beneath an envelope of any one of said series of peaks extends continuously beneath said depth of any adjacent valleys such that foam material is uninterrupted under the envelope to a depth greater than said depth of said adjacent valleys.

* * * * *

UNITED STATES PATENT AND TRADEMARK OFFICE
CERTIFICATE OF CORRECTION

PATENT NO. : 7,261,933 B2
APPLICATION NO. : 10/262735
DATED : August 28, 2007
INVENTOR(S) : Janusz P. Gorowicz et al.

It is certified that error appears in the above-identified patent and that said Letters Patent is hereby corrected as shown below:

Column 7, Line 35 change "root said" to --roof, said--.

Signed and Sealed this

Fourth Day of December, 2007

JON W. DUDAS
*Director of the United States Patent and Trademark Office*